United States Patent [19]
Kelley et al.

[11] Patent Number: 5,258,125
[45] Date of Patent: Nov. 2, 1993

[54] CARBOHYDRAZONES AS BOILER WATER OXYGEN SCAVENGERS

[75] Inventors: Douglas G. Kelley; Deborah M. Rogers, both of Naperville; Frederick J. Swiecinski, Algonquin, all of Ill.

[73] Assignee: Nalco Chemical Company, Naperville, Ill.

[21] Appl. No.: 872,255

[22] Filed: Apr. 22, 1992

[51] Int. Cl.$^5$ .............................. C02F 1/20; C02F 1/70
[52] U.S. Cl. ........................... 210/750; 210/757; 252/188.28; 252/392; 422/16
[58] Field of Search ................ 210/750, 757; 252/188.28, 392; 422/16, 17

[56] References Cited

U.S. PATENT DOCUMENTS

| | | | |
|---|---|---|---|
| 4,269,717 | 5/1981 | Slovinsky | 210/750 |
| 4,479,917 | 10/1984 | Rothgery et al. | 210/750 |
| 4,540,494 | 9/1985 | Fuchs et al. | 422/16 |

OTHER PUBLICATIONS

Copper-Catalyzed Autoxidation of Carbohydrazide: Kinetics and Mechanism, David R. Cosper and David J. Kowalski 0888-5885/90/2629-1130 American Chemical Society 1990.

Carbodihydrazones and Oxalyl Dihydrazones, D. M. Wiles and T. Suprunchuk, Canadian Journal of Chemistry, vol. 46, 1968, pp. 701-705.

Reactions of Carbohydrazide. Part II. A. M. Munro and F. J. Wilson, Jo. Chemical Society 1928—pp. 1257-1261.

XVIII.-Reactions of Carbohydrazide. Part I. Andrew C. Brown, Eric C. Pickering, Forsyth J. Wilson—Jo. Chemical Society 1927 pp. 107-113.

*Primary Examiner*—Ivars Cintins
*Attorney, Agent, or Firm*—Robert A. Miller; Joseph B. Barrett

[57] ABSTRACT

The invention is directed generally to controlling corrosion in boiler systems and more particularly to treating boiler water to remove dissolved oxygen and to passivate metal surfaces.

15 Claims, 2 Drawing Sheets

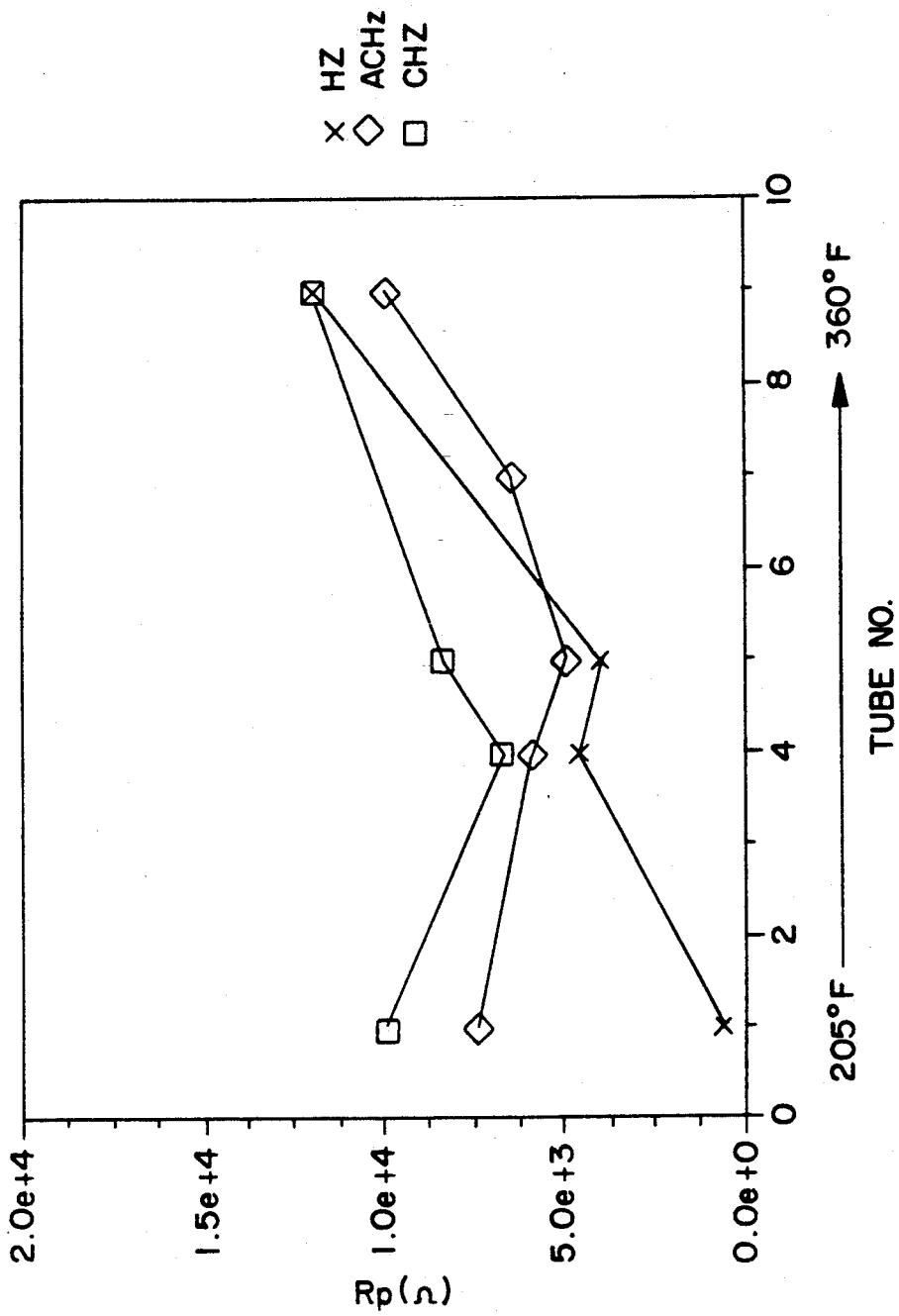

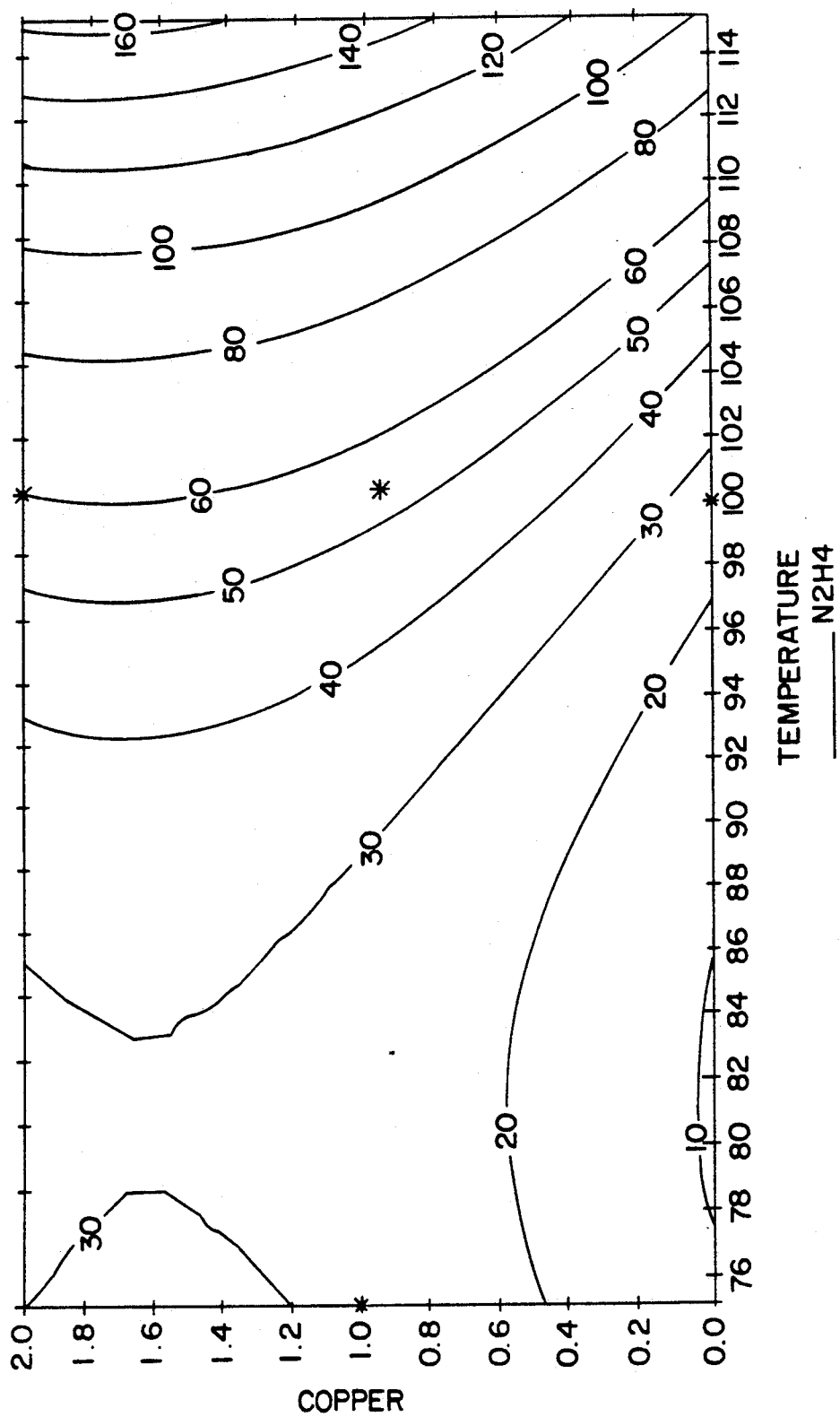

CARBOHYDRAZONES AS BOILER WATER OXYGEN SCAVENGERS

INTRODUCTION

Efficient operation of boilers and other steam-run equipment requires chemical treatment of feedwater to control corrosion. Corrosion in such systems generally arises as a result of oxygen attack of steel in water supply equipment, pre-boiler systems, boilers, and condensate return lines. Unfortunately, oxygen attack of steel is accelerated by the unavoidable high temperatures found in boiler equipment. Since acid pH's also accelerate corrosion, most boiler systems are run at alkaline pH's.

In most modern boiler systems, dissolved oxygen is handled by first mechanically removing most of the dissolved oxygen and then chemically scavenging the remainder. The mechanical degasification is typically carried out with vacuum degasifiers which will reduce oxygen levels to less than 0.5–1.0 mg/L or with deaerating heaters, which will reduce oxygen concentration to the range of 0.005–0.010 mg/L.

Chemical scavenging of the remaining dissolved oxygen is widely accomplished by treating the water with hydrazine. See, for example, the Kirk-Othmer Encyclopedia of Chemical Technology, Second Edition, Interscience, Publishers, Volume II, page 187. As explained in Kirk-Othmer, hydrazine efficiently eliminates the residual oxygen by reacting with the oxygen to give water and gaseous nitrogen. In addition, hydrazine is a good metal passivator since it forms and maintains an adherent protective layer of magnetite over iron surfaces.

Unfortunately, however, it has become widely recognized that hydrazine is an extremely toxic chemical. As a result, it is likely that worker exposure to this compound will be subjected to extremely severe tolerances by government occupational health agencies. It is therefore desirable to provide alternate boiler water treatment chemicals which are generally free of the dangers inherent in the use of hydrazine, but which effectively scavenge oxygen and passivate steel surfaces under typical boiler conditions.

An improved oxygen scavenger composition which overcomes many of the problems described above is the subject matter of U.S. Pat. No. 4,269,717, the disclosure of which is incorporated herein by reference. This patent teaches that carbohydrazide (CHz) is a superior boiler water oxygen scavenger. Recently, Cosper and Kowalski (I&EC Research, 1990, 29, 1130) reported that the scavenging of oxygen by CHz is most effectively catalyzed by cupric ions.

THE DRAWINGS

FIG. 1 compares the passivation effectiveness of acetaldehyde carbohydrazone versus hydrazine and carbohydrazide.

FIG. 2 illustrates the decomposition of acetaldehyde carbohydrazone to hydrazine.

THE INVENTION

The invention is directed generally to controlling corrosion in boiler systems and more particularly to treating boiler water to remove dissolved oxygen and to passivate metal surfaces.

One aspect of the invention provides a method for removing dissolved oxygen from boiler water having an alkaline pH. The method comprises adding to said boiler an oxygen scavenging amount of at least one carbohydrazone compound selected from the group of carbohydrazone compounds of the formula:

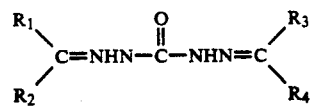

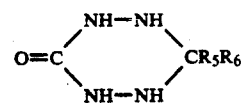

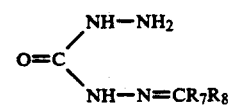

in which $R_1$, $R_2$, $R_3$, $R_4$, $R_5$, $R_6$, $R_7$ and $R_8$ are the same or different and are selected from hydrogen, alkyl groups, substituted alkyl groups, aryl groups, and substituted aryl groups.

According to a preferred embodiment, the carbohydrazone is added at a level of at least 0.5 moles of the carbohydrazone per mole of dissolved oxygen. Preferably, the boiler water is subjected to deaeration to reduce the level of dissolved oxygen and the carbohydrazone is added to the boiler water after deaeration to remove remaining dissolved oxygen. The carbohydrazone may also be used in conjunction with an oxidation-reduction catalyst. Preferred carbohydrazone compounds are acetaldehyde carbohydrazone (ACHz), dihydroxyacetone carbohydrazone (DHACHz), methyl tetrazone (MTz), dimethyl tetrazone (DMTz), hydroxymethyl tetrazone (HMTz), and dihydroxymethyl tetrazone (DHMTz).

A further aspect of the invention provides a method of removing dissolved oxygen from boiler water having alkaline pH and passivating boiler surfaces comprising adding to the boiler water at least 0.5 moles of the carbohydrazone per mole of dissolved oxygen along with from 0.2 up to about 20% by weight based on the carbohydrazone of a catalyst capable of undergoing oxidation-reduction reactions. Preferred catalysts of the invention are copper, hydroquinone, cobalt, and diethylhydroxylamine.

The carbohydrazones described above are readily prepared by reacting, carbohydrazide (CHz) with either aldehydes or ketones having the appropriate number of carbon atoms in an alkyl or substituted alkyl group defined by the formula previously shown.

Typical of the aldehydes that may be reacted with carbohydrazide are acetaldehyde, butyraldehyde, propionaldehyde, hydroxyacetaldehyde and the like. Starting ketones are acetone, butanone, hydroxyethyl ketone dihydroxy acetone and the like. In certain instances, it is possible to perform the reaction using two or more different aldehydes or ketones.

The reaction of any molar amount of an aldehyde or ketone from 0.1 to 2 with carbohydrazide yields a product which is more active and stable than carbohydrazide itself. The aldehydes or the ketones reacted with carbohydrazide to yield the corresponding carbohydrazone. In the case of (ACHz) this compound has been characterized by $^{13}$C-NMR, FTIR and elemental analysis. All of these compounds are stable at room temperature.

Products formed in a typical carbohydrazone reaction are illustrated by the ACHz products shown below:

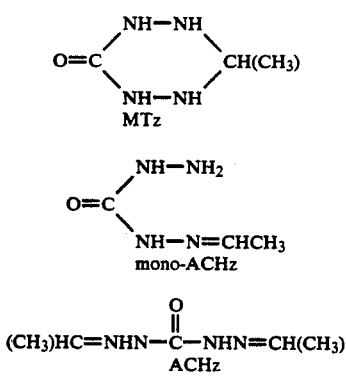

$$(CH_3)HC=NHN-\overset{\overset{O}{\|}}{C}-NHN=CH(CH_3)$$
ACHz

Although ACHz or MTz may be added to the boiler system at any point, it is most efficient to treat the boiler feedwater, preferably as it comes from the degasifier. Residence times prior to steam formation should be maximized to obtain maximum corrosion protection. While ACHz or MTz will control corrosion even if the residence times are as low as 2-3 minutes, residence times of 15-20 minutes or more are preferred.

The amount of ACHz or MTz required to effectively scavenge oxygen from the boiler water is dependent upon the amount of oxygen actually present therein. It is generally desirable that at least 0.5 moles of ACHz or MTz be used per mole of oxygen. These minimum levels of ACHz or MTz will have the added benefit of effectively passivating metal surfaces. Of course, levels of ACHz or MTz considerably in excess of 0.5 moles per mole of oxygen may be required, particularly for treating boiler feedwater under static storage conditions. Under such static conditions, for example, treatment levels of 160 moles or more of ACHz or MTz per mole of oxygen have proven effective in controlling corrosion.

ACHz and MTz are effective oxygen scavengers and metal passivators over the entire range of temperatures to which boiler feedwater is generally subjected. Typically, these temperatures will be in the range of 120°-350° F.

While it is well known that each molecule of ACHz or MTz is capable of being hydrolyzed to 2 molecules of hydrazine, the extent of hydrolysis under typical boiler conditions is very minor. This fact has been illustrated in the examples below which further demonstrates that ACHz and MTz are effective oxygen scavengers and metal passivators in their own right.

In one important embodiment, the present invention provides a method of removing dissolved oxygen from boiler water by adding to the water an oxygen scavenging amount of either acetaldehyde carbohydrazone (ACHz) or methyl tetrazone (MTz) which are soluble in water. ACHz or MTz may be used either as a dry powder or as a solution.

While ACHz or MTz may be used alone in the present application, it is preferred that they be catalyzed. For this purpose, it is desirable to use catalysts which undergo oxidation-reduction reactions. For example, hydroquinone, other quinones and diethylhydroxylamine (DEHA) can be used to catalyze the ACHz or MTz since they are capable of undergoing oxidation-reduction reactions. When a quinone or DEHA catalyst is used, the amount of quinone added in relation to the carbohydrazone should be in the range of 0.2 to 20% by weight of the carbohydrazone.

Another oxidation-reduction catalyst useful with ACHz or MTz in the present application is cobalt, preferably in a stabilized form. The amount of cobalt used in relation to the carbohydrazone should be in the range of 0.2 to 20% by weight of the carbohydrazone. Typical useful stabilized cobalt complexes are described in the following U.S. Patent Nos., which are hereby incorporated by reference: U.S. Pat. Nos. 4,012,195; 4,022,711; 4,022,712; 4,026,664; and, 4,095,090. Also, as in the case of CHz, cupric ions effectively catalyze the scavenging of oxygen by ACHz and MTz.

PREPARATIONS

The reaction of one mole of carbohydrazide (CHz=(H$_2$NHN)$_2$C=O) with two moles of acetaldehyde, CH$_3$CHO, in water yields acetaldehyde carbohydrazone (ACHz=(CH$_3$CH=NHN)$_2$C=O). ACHz has been characterized by $^{13}$C NMR, FTIR and elemental analysis and has been shown to scavenge oxygen efficiently while not decomposing at room temperature to hydrazine.

The reaction of one mole of CHz with one mole of CH$_3$CHO in water yields a solution of methyl tetrazone. The solution was actually found to contain about 9 parts MTz to 1 part mono-ACHz, but will be referred to as a MTz solution for simplicity.

To illustrate the invention, the following examples are presented:

EXAMPLE 1

Solutions of ACHz were shown to outperform CHz in oxygen-scavenging efficiency at 185° F. A laboratory bench-top feedwater simulator was used under air-saturated conditions (~6 ppm O$_2$) and the feedwater was adjusted to pH 9-10. A solution of oxygen-scavenging chemical was fed using a syringe pump at a rate of 0.385 mL/minute. Under these flow conditions, the retention time of the feedwater in the hot zone of this stainless steel system (185° F.) was about 12 minutes. Using a 2:1 mole ratio of scavenger to oxygen, as shown in Table 1, uncatalyzed ACHz removed over two times as much oxygen as uncatalyzed CHz from the feedwater. The reaction time was defined as beginning immediately after the 12 minute retention time and ending when the reaction was completed. Hydroxyacetaldehyde carbohydrazone (HACHz=(HOCH$_2$CH=NHN)$_2$C=O) showed reactivity comparable to that of CHz, while acetone carbohydrazone (AcCHz=((CH$_3$)$_2$C=NHN)$_2$C=O) was a less effective oxygen scavenger. Hydrazine was mostly ineffective at this temperature. In the absence of catalyst, no carbohydrazone, carbohydrazide or hydrazine removed oxygen completely at this temperature.

TABLE I

Comparison of Uncatalyzed Oxygen-Scavengers at 185° F. with a 2:1 Molar Ratio of Scavenger to Oxygen.

| Solution | % Oxygen Removed | Reaction Time/min |
|---|---|---|
| ACHz | 34 | 30 |
| HACHz | 11 | 30 |
| AcCHz | 6 | 30 |
| CHz | 15 | 30 |

TABLE I-continued

Comparison of Uncatalyzed Oxygen-Scavengers at 185° F. with a 2:1 Molar Ratio of Scavenger to Oxygen.

| Solution | % Oxygen Removed | Reaction Time/min |
|---|---|---|
| $N_2H_4$ | 7 | 30 |

EXAMPLE 2

The effect of catalyst on the oxygen-scavenging ability of various compounds was studied using the bench-top feedwater simulator under conditions identical to those in Example 1. A 2:1 molar ratio of scavenger to oxygen was used and these results are displayed in Table II. In the presence of copper catalyst, both ACHz and CHz completely removed oxygen from the feedwater, but ACHz achieved this result two times faster than CHz. Note that the reactivity of HACHz was enhanced in the presence of catalyst, while AcCHz showed the least activity.

TABLE II

Comparison of Catalyzed Oxygen-Scavengers at 185° F. with a 2:1 Molar Ratio of Scavenger to Oxygen.
(catalyst = 2 ppm $CuCl_2$)

| Solution | % Oxygen Removed | Reaction Time/min |
|---|---|---|
| ACHz | 100 | 30 |
| HACHz | 85 | 30 |
| AcCHz | 34 | 70 |
| CHz | 100 | 70 |
| $N_2H_4$ | 74 | 80 |

EXAMPLE 3

The feedwater temperature simulator measures the efficiency of oxygen-removal by scavengers at oxygen concentrations comparable to actual boiler feedwater conditions. Using the feedwater temperature simulator, solutions of ACHz were shown to outperform CHz in oxygen-scavenging efficiency at 300° F. The feedwater was adjusted to a flowrate of 70 ml/minute, pH of 9–10 and oxygen baseline of ~100 ppb. Then a 60 mL solution of oxygen-scavenger was fed using a syringe pump at a rate of 0.028 mL/minute. Under these flow conditions, the retention time of the feedwater in the hot zone of the system (300° F.) was 12.9 min. The results are shown in Table III. Using a 2:1 molar ratio of scavenger to oxygen, an uncatalyzed ACHz solution removed 35% of the oxygen in the system while CHz removed 18% of the oxygen. At a 4:1 ratio, 63% of the initial oxygen concentration was scavenged. Therefore, as with the bench-top unit, ACHz was shown to be twice as effective as CHz in scavenging oxygen using the feedwater temperature simulator.

The ACHz scavenging efficiency is noteworthy since no catalyst was employed in these studies and the feedwater temperature simulator is made of stainless steel. It is likely that copper (II) contamination in a mild steel boiler will enhance the extent of oxygen-scavenging.

TABLE III

Comparison of Uncatalyzed Oxygen-Scavengers at 300° F.

| Solution | % Oxygen Removed |
|---|---|
| 2:1 ACHz | 35 |
| 4:1 ACHz | 63 |
| 8:1 ACHz | 81 |
| 2:1 EA[a] | 40 |
| 2:1 CHz | 18 |

[a]EA = erythorbic acid.

EXAMPLE 4

Corrosion studies indicated that ACHz is an effective metal passivating agent, under both low and high temperature conditions. In the experiment, feedwater containing less than 2 ppb $O_2$ was passed through a series of mild steel tubes of increasing temperatures for three days. This caused the formation of an initial oxide layer on the tube surfaces. For the next three days the feedwater was treated with ACHz solution. Analysis of these tubes by linear polarization resulted in polarization resistance values (Rp) which show a further developing passivation layer on each tube. Observation of the tubes revealed that each was covered with an adherent black magnetite surface. The results of three runs were averaged and are shown in FIG. 1, indicating that ACHz is an efficient metal passivating agent, though not as effective as CHz. In comparison to hydrazine, ACHz is a much better passivating agent at low temperatures and shows comparable passivation at elevated temperatures.

EXAMPLE 5

Stability studies have shown that ACHz solutions are resistant to decomposition to hydrazine over a period of seven months at room temperature. An experimental design was performed to determine the effects of cupric ion, ferrous ion, and temperature on the decomposition of ACHz solutions to give hydrazine. The values of the curves in FIG. 2 represent the hydrazine concentration under varying conditions of temperature (x-axis, °F.) and copper (y-axis, ppm $Cu^{2+}$). As shown in FIG. 2, temperature was found to have the largest effect on hydrazine accumulation, while copper concentration had a more mild effect. The effect of iron was small, though measureable amounts of hydrazine were detected in iron-containing solutions over time. Note from FIG. 2 that storage of ACHz solutions at 80° F., 0 ppm $Cu^{2+}$ and 2.5 ppm iron for two months resulted in a hydrazine concentration of less than 10 ppm. In the absence of metal ions, ACHz solutions were shown to accumulate less than 4 ppm hydrazine after seven months at room temperature.

EXAMPLE 6

Carbohydrazide solutions (6.5 wt. %) were prepared and varying amounts of acetaldehyde were added. The reaction between CHz and acetaldehyde was performed by adding neat $CH_3CHO$ slowly to the vigorously stirring carbohydrazide solution. Thus, solutions containing a range of molar ratios were prepared from 1:0.25 to 1:1.25 ($CHz:CH_3CHO$). These solutions were then stored in glass jars at room temperature for one month. At this time, the solutions were analyzed for residual hydrazine. The resulting hydrazine concentrations (in ppm), shown in Table IV, were observed to decrease with increasing $CH_3CHO$. This result is consistent with the formation of MTz and ACHz which are more stable toward decomposition to hydrazine than carbohydrazide; thereby imparting greater stability to the solution upon storage.

TABLE IV

Hydrazine analysis of 6.5 wt. % CHz solutions containing various amounts of acetaldehyde.

| Molar Ratio (CHz:CH$_3$CHO) | [N$_2$H$_4$]/ppm Day 30 at Room Temperature |
|---|---|
| 1:0 | 26 |
| 1:0.25 | 19 |
| 1:0.50 | 15 |
| 1:0.75 | 12 |
| 1:1 | 5 |
| 1:1.25 | 6 |

Having described our invention, we claim:

1. A method for removing dissolved oxygen from boiler water having an alkaline pH which comprises adding to said boiler an oxygen scavenging amount of at least one carbohydrazone compound selected from the group of carbohydrazone compounds consisting of:

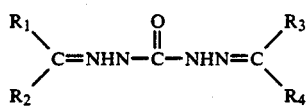   1)

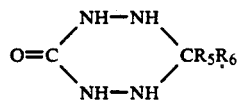   2)

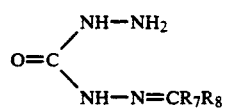   3)

in which R$_1$, R$_2$, R$_3$, R$_4$, R$_5$, R$_6$, R$_7$ and R$_8$ are, individually, hydrogen, an alkyl group, a substituted alkyl group, an aryl group, and a substituted aryl group.

2. The method according to claim 1 wherein the carbohydrazone is added at a level of at least 0.5 moles of the carbohydrazone per mole of dissolved oxygen.

3. The method of claim 1 wherein the boiler water is subjected to a deaeration step to reduce the level of dissolved oxygen and the carbohdrazone is added to the boiler water after deaerating to remove remaining dissolved oxygen.

4. The method of claim 1 wherein the carbohydrazone is used in conjunction with an oxidation-reduction catalyst.

5. The method of claim 1 in which the carbohydrazone is acetaldehyde carbohydrazone.

6. The method of claim 1 in which the carbohydrazone is dihydroxyacetone carbohydrazone.

7. The method according to claim 1 in which the carbohydrazone is methyl tetrazone.

8. The method according to claim 1 in which the carbohydrazone is dimethyl tetrazone.

9. The method according to claim 1 in which the carbohydrazone is hydroxymethyl tetrazone.

10. The method according to claim 1 in which the carbohydrazone is dihydroxymethyl tetrazone.

11. A method of removing dissolved oxygen from boiler water having alkaline pH and passivating boiler surfaces, the method comprising the step of adding to the boiler water at least 0.5 moles of a carbohydrazone per mole of dissolved oxygen along with from 0.2 to about 20% by weight based on the carbohydrazone of a catalyst capable of undergoing oxidation-reduction reactions.

12. The method of claim 11 wherein the catalyst is copper.

13. The method of claim 11 wherein the catalyst is hydroquinone.

14. The method of claim 11 wherein the catalyst is cobalt.

15. The method of claim 11 wherein the catalyst is diethylhydroxylamine.

* * * * *